(12) United States Patent
Djordjevic et al.

(10) Patent No.: US 11,323,478 B2
(45) Date of Patent: May 3, 2022

(54) USER EQUIPMENT CONTAINERS AND NETWORK SLICES

(71) Applicant: TELEFONAKTIEBOLAGET LM ERICSSON (PUBL), Stockholm (SE)

(72) Inventors: Branko Djordjevic, Herzogenrath (DE); Ralf Keller, Würselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 331 days.

(21) Appl. No.: 15/517,474

(22) PCT Filed: Apr. 3, 2017

(86) PCT No.: PCT/IB2017/051896
§ 371 (c)(1),
(2) Date: Apr. 6, 2017

(87) PCT Pub. No.: WO2017/178921
PCT Pub. Date: Oct. 19, 2017

(65) Prior Publication Data
US 2018/0191782 A1    Jul. 5, 2018

Related U.S. Application Data

(60) Provisional application No. 62/323,349, filed on Apr. 15, 2016.

(51) Int. Cl.
*H04L 67/289* (2022.01)
*H04L 29/06* (2006.01)
(Continued)

(52) U.S. Cl.
CPC .......... *H04L 63/20* (2013.01); *G06F 9/45558* (2013.01); *G06F 9/547* (2013.01);
(Continued)

(58) Field of Classification Search
CPC ....... H04L 63/20; H04L 67/28; H04L 63/029; H04L 63/0428; H04L 67/289;
(Continued)

(56) References Cited

U.S. PATENT DOCUMENTS

2011/0113467 A1* 5/2011 Agarwal ............. G06F 21/6281
726/1
2011/0125905 A1* 5/2011 Baucke ................. H04M 15/00
709/226
(Continued)

FOREIGN PATENT DOCUMENTS

| TW | 201443775 A | 11/2014 |
|---|---|---|
| WO | 2012/054016 A1 | 4/2012 |
| WO | 2015/021547 A1 | 2/2015 |

OTHER PUBLICATIONS

Nkaein et al., "Network Store: Exploring Slicing in Future 5G Networks", Sep. 7-7, 2015, MobiArch '15 Proceedings of the 10th International Workshop on Mobility in the Evolving Internet Architecture, pp. 8-13. (Year: 2015).*

Ramaswamy Chandramouli, "Secure Virtual Network Configuration for Virtual Machine (VM) Protection", Mar. 2016, NIST, Department of Commerce, NIST Special Publication 800-125B, p. 1-30. (Year: 2016).*

(Continued)

*Primary Examiner* — Nelson S. Giddins
(74) *Attorney, Agent, or Firm* — Withrow & Terranova, PLLC

(57) ABSTRACT

A communication device comprises a container environment with a plurality of containers each having one or more applications and each being connectable to a network slice, and a container manager configured to control communication between the applications and the network slices, wherein the container manager prohibits communication between a first application in a first container and a second application in a second container.

35 Claims, 11 Drawing Sheets

(51) Int. Cl.
  *G06F 9/54* (2006.01)
  *H04L 67/04* (2022.01)
  *H04L 67/56* (2022.01)
  *G06F 9/455* (2018.01)
  *H04W 4/06* (2009.01)
  *H04L 67/2866* (2022.01)

(52) U.S. Cl.
  CPC ........ *H04L 63/029* (2013.01); *H04L 63/0428* (2013.01); *H04L 63/0853* (2013.01); *H04L 67/04* (2013.01); *H04L 67/28* (2013.01); *H04L 67/289* (2013.01); *H04W 4/06* (2013.01); *G06F 2009/4557* (2013.01); *H04L 67/2866* (2013.01)

(58) Field of Classification Search
  CPC . H04L 63/0853; H04L 67/04; H04L 67/2866; G06F 9/45558; G06F 9/547; G06F 2009/4557; G06F 21/53; H04W 4/06
  See application file for complete search history.

(56) References Cited

U.S. PATENT DOCUMENTS

| | | | |
|---|---|---|---|
| 2012/0324069 A1* | 12/2012 | Nori | G06F 9/5066 709/222 |
| 2013/0128784 A1* | 5/2013 | Nakao | H04L 12/6418 370/310 |
| 2016/0255456 A1* | 9/2016 | Lee | H04L 63/0227 455/419 |
| 2017/0079059 A1* | 3/2017 | Li | H04W 16/02 |
| 2017/0257424 A1* | 9/2017 | Neogi | H04L 43/16 |
| 2018/0070262 A1* | 3/2018 | Nakano | H04W 28/24 |
| 2019/0005224 A1* | 1/2019 | Oliver | G06F 21/57 |

OTHER PUBLICATIONS

First Office Action for Chinese Patent Application No. 201780023815.3, dated Nov. 4, 2020, 23 pages.

* cited by examiner

USER EQUIPMENT CONTAINERS AND NETWORK SLICES

CROSS-REFERENCE TO RELATED APPLICATIONS

This application claims priority to U.S. Provisional Patent Application No. 62/323,349 filed on Apr. 15, 2016, the disclosure of which is hereby incorporated by reference in its entirety.

TECHNICAL FIELD

The disclosed subject matter relates generally to telecommunications. Certain embodiments relate more particularly to concepts such as network slices, containers, and user equipment ("UE").

BACKGROUND

A network slice is a logical network, typically serving a defined business purpose or customer. A network slice may take the form of e.g. a network part or subnetwork. A network slice typically comprises a set of required network resources that are configured together. For instance, control plane and user plane resources are part of a network slice.

A network slice may in certain contexts be created, changed or modified by management functions. Such functions may be implemented by e.g. mobility management, session management, identity management, access management. Additionally, a network slice is typically implemented end-to-end within a provider. This means that all network entities required for the end-to end communication between Radio Access Network (RAN) and gateways to other networks are part of a slice (or shared amongst multiple slices, e.g. a single AMF instance may be used for multiple slices by the same UE).

A network slice generally acts as an enabler of services, and not a service itself. For instance, a slice may enable mobile broadband or voice service, but the content accessed over mobile broadband or any Internet Protocol (IP) Multimedia Subsystem (IMS) server needed for voice service are not part of the network slice. The resources of a network slice may be physical or virtual, and they may be dedicated or shared. For example, parts of a RAN node require hardware (like antennas), and other parts may be implemented as software in a virtualized environment, and both may be shared by multiple devices and for multiple slices. Other examples include core network functions like user plane functions (UPF) that can be implemented in a virtualized environment and only be instantiated for a particular slice. A network slice is generally logically independent or isolated from other network slices, although different network slices may share network resources. Additionally, a network slice may integrate services from providers other than the one operating the network slice, which may facilitate e.g. aggregation and roaming.

FIG. 1 illustrates an example system 100 in which a network communication network 105 provides services/products 110 to users (e.g. businesses, customers, etc.) via network slices 125.

Referring to FIG. 1, communication network 105 comprises resources/components 115, network slices 125, and network slice management 120. In this example, resources/components 115 may comprise e.g. access resources, transport resources, cloud resources, network functions, and network management. Resources/components 115 are used by network slices 125, under control of network slice management 120, to provide services/products 110 to the users. In this example, services/products 110 may comprise e.g. a logical mobile broadband (MBB) network, a logical enterprise network, or a logical mobile data network (MDN). The use of network slices 125 allows different services/products to be provided to different users in isolated fashion, which means that those services/products can be adapted to meet the specific needs of those users.

SUMMARY

In some embodiments of the disclosed subject matter, a device comprises a container environment comprising a plurality of containers each having one or more applications and each being connectable to a network slice, and a container manager configured to control communication between the applications and the network slices, wherein the container manager prohibits communication between a first application in a first container and a second application in a second container.

In certain related embodiments, the device further comprises device resources, wherein the container manager controls access of applications to the device resources.

In certain related embodiments, applications in different containers share the device resources.

In certain related embodiments, each container is associated with exactly one network slice at a time. In some such embodiments, the association between the container and the network slice comprises using a dedicated access point name (APN) for the network slice. In some other such embodiments, the association between the container and the network slice comprises using encrypted communication between the container and the network slice via a shared access point name (APN). In still other such embodiments, the association between the container and the network slice comprises using tunneling between the container and the network slice.

In certain related embodiments, each container uses its own electronic subscriber identity module (eSIM) to access credentials for authentication and/or authorization. In certain other related embodiments, at least two of the containers use the same electronic subscriber identity module (eSIM) to access credentials for authentication and/or authorization.

In certain related embodiments, at least two of the network slices are served by the same operator.

In certain related embodiments, at least one of the network slices corresponds to a virtual operator.

In certain related embodiments, the container manager defines rules per container and controls communication between containers such that communication is allowed between applications in the same container and is prohibited between applications in different containers.

In certain related embodiments, the device further comprises device resources, wherein each of the containers has a container configuration policy that governs access by the container to the device resources.

In certain related embodiments, the containers operate in parallel.

In certain related embodiments, the device further comprises a device operating system, and a plurality of container operating systems each associated with a corresponding container among the plurality of containers.

In certain related embodiments, the container manager comprises a register comprising information that identifies an association between containers and network slices, interfaces towards containers and network slices, and memory storing coded instructions that when executed by the container manager processor cause the container manager to receive a manifest for a container via the network slice interface, generate at least one container as defined by the manifest, generate a rule set for the generated container according to constraints in the manifest, establish a connection between the generated container and a corresponding network slice, and control communication between the generated container and the corresponding network slice according to the generated rule set.

In certain related embodiments, the instructions cause the container manager to store the manifest in the container slice register together with the generated rule set In certain related embodiments, the instructions cause the container manager to maintain a container focus pointer indicating an entry in the container slice register based on focus provided by an operator/user, and to give priority to the indicated entry when evaluating the rule set.

In some embodiments of the disclosed subject matter, a method is provided for managing containers in a device comprising a container environment and a container manager, the container environment comprising a plurality of containers each comprising one or more applications, each container being connectable to a network slice. The method comprises receiving a manifest for a container via the network slice interface, generating a container according to the manifest, generating a rule set for the generated container according to constraints in the manifest, establishing a connection between the generated container and a corresponding network slice, and controlling communication between the generated container and the corresponding network slice according to the generated rule set.

In certain related embodiments, the method further comprises storing the manifest in a container slice register.

In certain related embodiments, the method further comprises maintaining a container focus pointer indicating an entry in the container slice register based on focus provided by an operator/user, and to give priority to the indicated entry when evaluating the rule set.

In some embodiments of the disclosed subject matter, a method of operating a communication device comprises providing a container environment comprising a plurality of containers each having one or more applications and each being connectable to a network slice, and operating a container manager to control communication between the applications and the network slices, wherein the container manager prohibits communication between a first application in a first container and a second application in a second container.

In certain related embodiments, the communication device further comprises device resources, and the method further comprises operating the container manager to control access of applications to the device resources.

In certain related embodiments, applications in different containers share the device resources.

In certain related embodiments, each container is associated with exactly one network slice at a time.

In certain related embodiments, the association between the container and the network slice comprises using a dedicated access point name (APN) for the network slice.

In certain related embodiments, the association between the container and the network slice comprises using encrypted communication between the container and the network slice via a shared access point name (APN).

In certain related embodiments, the association between the container and the network slice comprises using tunneling between the container and the network slice.

In certain related embodiments, each container uses its own electronic subscriber identity module (eSIM) to access credentials for authentication and/or authorization. In certain other related embodiments, at least two of the containers use the same electronic subscriber identity module (eSIM) to access credentials for authentication and/or authorization.

In certain related embodiments, at least two of the network slices are served by the same operator. In certain other related embodiments, at least one of the network slices corresponds to a virtual operator.

In certain related embodiments, the container manager defines rules per container and controls communication between containers such that communication is allowed between applications in the same container and is prohibited between applications in different containers.

In certain related embodiments, the wireless device further comprises device resources, wherein each of the containers has a container configuration policy that governs access by the container to the device resources.

In certain related embodiments, the containers operate in parallel.

In certain related embodiments, the method further comprises receiving a manifest for a container via the network slice interface, generating at least one container as defined by the manifest, generating a rule set for the generated container according to constraints in the manifest, establishing a connection between the generated container and a corresponding network slice, and controlling communication between the generated container and the corresponding network slice according to the generated rule set. In some such embodiments, the method further comprises storing the manifest in the container slice register together with the generated rule set. In some such embodiments, the method further comprises maintaining a container focus pointer indicating an entry in the container slice register based on focus provided by an operator/user, and to give priority to the indicated entry when evaluating the rule set.

BRIEF DESCRIPTION OF THE DRAWINGS

The drawings illustrate selected embodiments of the disclosed subject matter. In the drawings, like reference labels denote like features.

DETAILED DESCRIPTION

Figure 1:
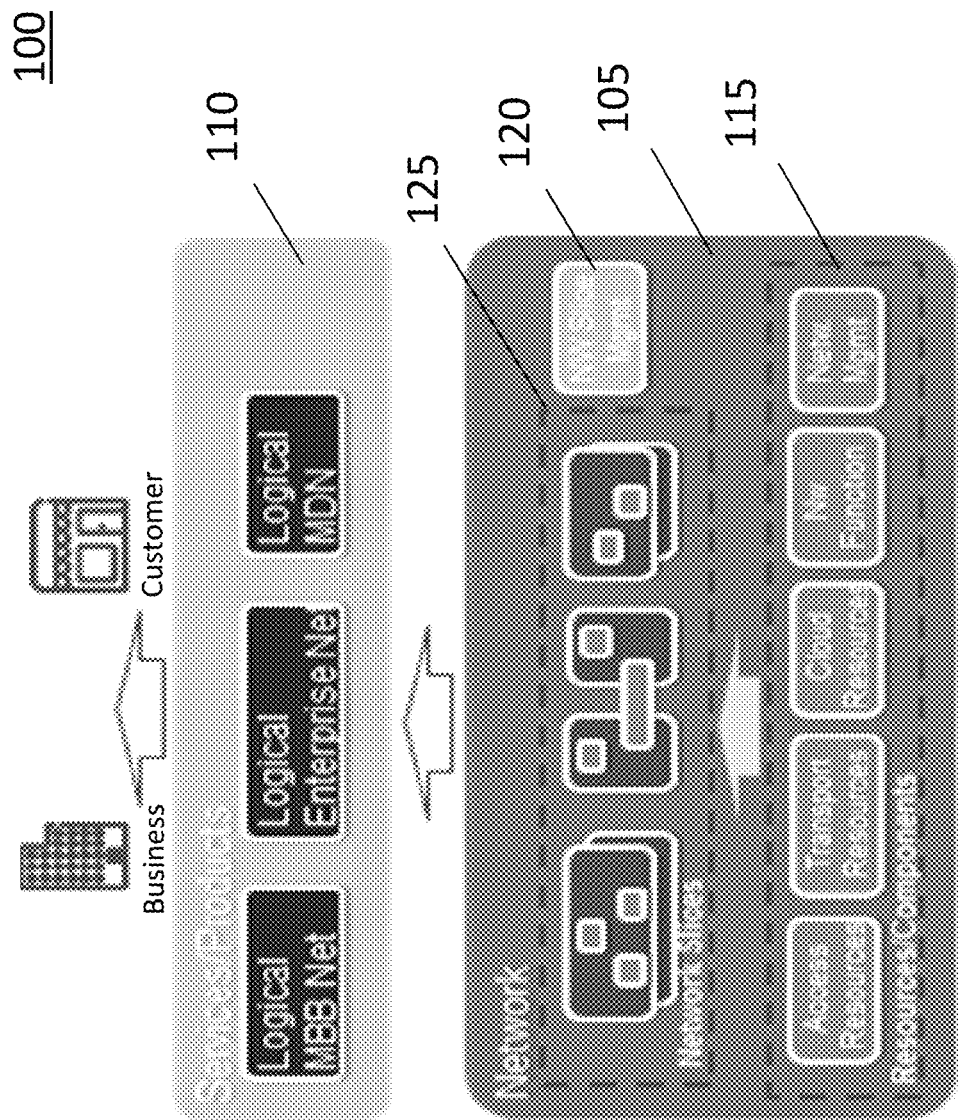
FIG. 1 illustrates a system comprising multiple network slices.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the disclosed subject matter.

Certain embodiments are presented in recognition of shortcomings associated with conventional techniques and technologies, such as the following examples. In conventional systems, a particular device uses a single network slice. However, there may be applications running on a device that serve different business purposes. These use cases are neither clearly separated on the device nor associated with specific network slices, so each application must protect itself and there is no mechanism to assign an application to a particular slice and to ensure that only applications belonging to the same slice are using the same capabilities and have access to the same data. This may create security concerns for enterprises.

Certain embodiments may also provide benefits compared to conventional techniques and technologies, such as the following examples. First, certain embodiments may improve security by e.g. using containers to prevent malware from spreading and/or increasing robustness to malicious applications. Second, certain embodiments may improve privacy by e.g. maintaining private and business applications in the separate containers, and/or using different rule-sets for different containers to limit application capabilities (e.g. no user data logging, no call or address book logging for torch-light applications, etc.). Third, certain embodiments may provide enhanced ability to meet service level agreements (SLAs) e.g. by correlating UE containers with network slices, guaranteed traffic performance can be achieved (e.g., system service key performance indicators [S-KPIs]).

In certain embodiments described below, a device comprises a plurality of containers each associated with a network slice and uniquely identifying the association. The device prevents communication between applications that are placed in one container with applications in other containers.

Each container is typically associated with exactly one network slice at a time. This association can be implemented e.g. using a dedicated access point name (APN) for the network slice or via encrypted communication via a shared APN like the Internet APN or other types of tunneling than internet protocol security (IPsec) from each container on the device towards and via the network slice.

Some embodiments may include a combination of described features, such as using a dedicated network slice if supported by a visited network and using as a "fallback" encrypted communication via a shared APN. Also, in some embodiments each container may use its own (soft/e) SIM to access credentials for authentication and authorization.

Several containers on a device can use the same eSIM. This typically requires using an additional slice identifier per container for the communication.

Communication from containers is via a device supported accesses. An operator can serve multiple slices, and a virtual operator may be represented by a network slice or multiple network slices. The use of different cellular radio accesses in parallel to access multiple non-virtual operators may require support of multiple radio modules.

A device may have its own operating system supporting a container environment (device OS), and each container may additionally have a dedicated operating system for that container only (container OS). Both network slices and containers have an identity, and these identities are associated in the device. Identities may be based on existing identities in the device. In embodiments where a container has a container OS, the device may include a virtualization platform (e.g. a hypervisor) on which the container OS may run.

The device OS supports containers in which particular applications for a particular network slice are running or executed. An application running in one particular container may be prevented from accessing applications, data, and/or services in another container, because the device OS shields the containers from each other. The application or service may access device resources such as a network interface, modem, camera, etc. in common with other containers.

Each network slice provides constraints on the device that define the manner and extent to which the device may access the network slice. These constraints may be presented in a manifest for the network slice (a "slice manifest" or "container manifest"), and they may govern e.g. access type, device location, use of device resources, population of container with applications, use of container, or modification of container and applications.

The term "device" can refer to any apparatus having a connection to a network. Examples include end-user devices e.g. a user equipment (UE) or a personal computer (PC), or devices not specifically indicated as end-user devices, such as e.g. internet-of-things (IOT) devices.

The term "connection" can refer to any form of connection (e.g. wireline or wireless) that enables a device to send and/or receive information to and/or from the network. Example wireline connection technologies include local area network (LAN) and digital subscriber line (DSL). Example wireless connection technologies include general packet radio service (GPRS) in 2G or 3G radio technology, 4G Long Term Evolution (LTE), and 5G next generation radio technologies. A device could also use some other technology to connect to a network, such as WiFi or Bluetooth.

A device may have multiple connections to the network using any wireline or wireless technology. Alternatively, a device may be restricted to use one connection at a time or may support using multiple connections in parallel.

Figure 2:
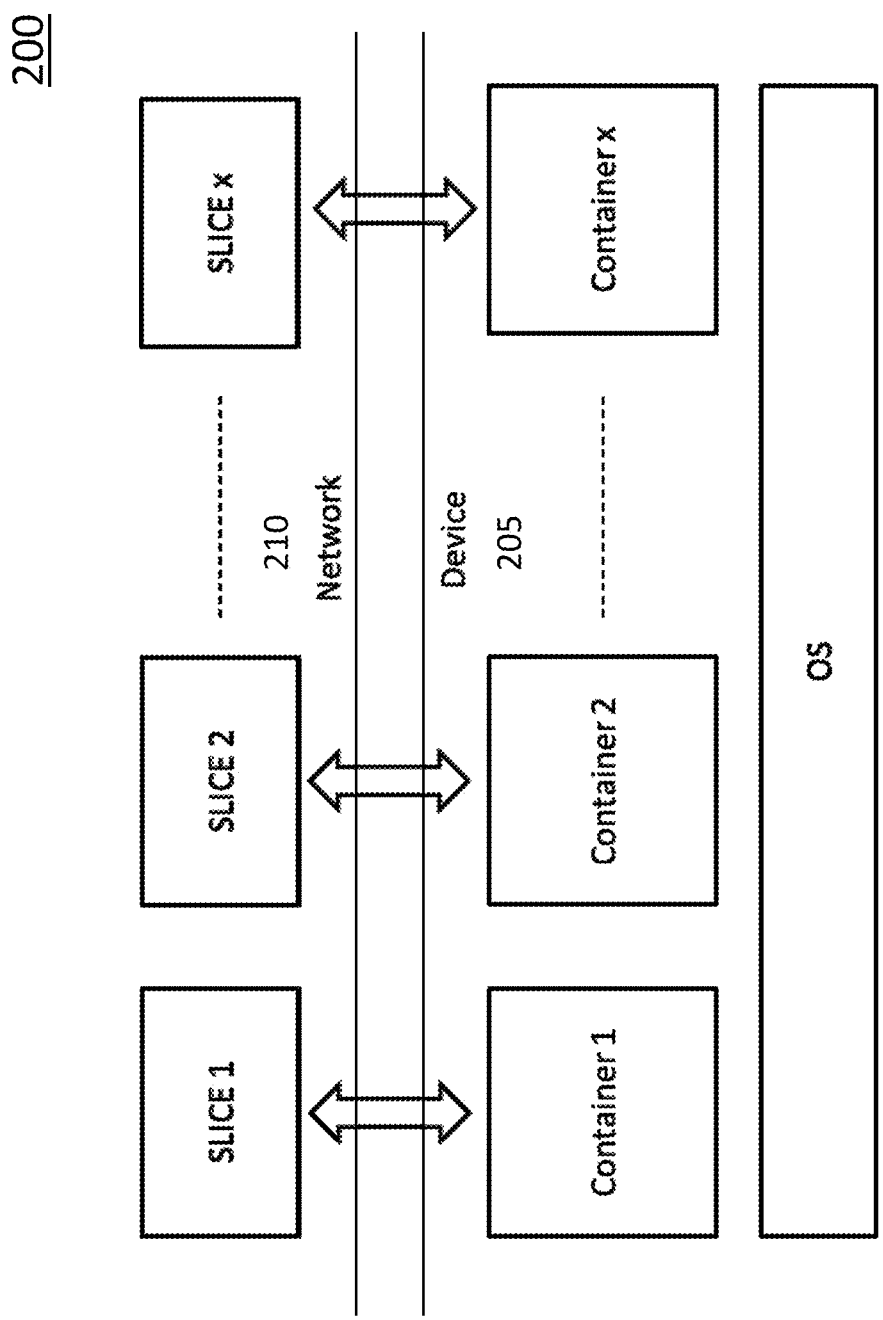
FIG. 2 illustrates a system comprising a device with multiple containers and a network with multiple network slices, according to an embodiment of the disclosed subject matter.

FIG. 2 illustrates a system 200 comprising a device 205 and a network 210 according, to an embodiment of the disclosed subject matter.

Referring to FIG. 2, device 205 comprises a plurality of containers 1-*x*, and network 210 comprises a plurality of network slices 1-*x* that correspond to respective containers 1-*x*. Device 205 further comprises an OS that is common to all of containers 1-*x*.

The term "container" can refer to a protected environment where one or more applications can run in a device and that is associated with a network slice. Applications inside the container can communicate with each other, as far as they allow themselves communication. Applications outside the container cannot communicate with applications inside the container. This prevents applications outside the container from eavesdropping, scanning, sniffing, adding tracing, adding markings or otherwise getting information only intended for applications inside the container. This may include information exchanged by applications but also any information in the device OS, memory, register or other device resources. Malicious applications can also manipulate or access other applications and/or data, which can be prevented by the use of containers.

A device typically has at least two containers and all applications are inside a container, i.e. there are no applications outside containers. The number of containers actually used in the device depends on the end-uses of the device. A first container is denoted as a default container that is used for private or other general purpose. In certain embodiments, no restriction is placed on applications that are put inside this container. Further containers are associated with network slices for specific purposes. The specific purpose may also dictate constraints in relation to the container associated with the network slice. If the network has a slice for default use also the first container is associated with the slice for default use. The association between container and network slice can be seen as an extension of the network slice into the device and into the container.

Although it is possible to connect a container to more than one network slice, it may require resolving conflicts between constraints provided by multiple network slices. For the remainder a one to one association between container and network slice is anticipated unless otherwise indicated.

Some embodiments include one container, with private applications configured outside the container. The applications outside the container are a potential security risk. Precautions should be taken e.g. all applications outside the one container are deactivated before the container with the applications is activated and these applications cannot be activated thereafter. This might be implemented via a device restart.

Also possible is a device having one container and no applications outside the container. Such may be valid e.g. with internet-of-things (IOT) devices. Having one container ensures the network slice that any constraints as well as identity elements are secured.

A device may have a container manager function to control a container environment of the device. The container management function may be part of the device OS. It may also be an added software function on top of the operating system. The container manager function could also be implemented as a dedicated hardware module/unit of the device. The module/unit may even replace the device's own operating system. The container manager defines rules per container and controls the communication between the containers and the network.

For instance, the container manager may use the constraints provided by the network slices to define a set of rules for the containers. Based on these rules, the container manager may perform any of the following example actions: (a) adding, updating or removing containers, (b) adding, updating or removing applications in the containers, (c) activation and deactivation of applications, (c) controlling network access by the applications in the containers, (d) routing, encryption and decryption of messages between applications in the container and the network slices, or (e) controlling access to device resources by applications in the containers.

Devices may have some form of unique identity. One example is the USIM/UICC card in a mobile telephone. Another example is the equipment identity (IMEI) as used in 3GPP 2G, 3G, and 4G radio technologies. This is a unique device identifier apart from the SIM card provided identity. Another possible identifier is the soft SIM or eSIM. A container may require a coupling to a unique identifier. More than one container may use the same unique identifier. A container could also require more than one identifier. For example, both the unique equipment identifier and SIM card provided user identity may be required to allow establishing or running applications in a container in the device.

Like the device, a network slice may also use an identification to be able to address and connect to it. This can be achieved by a specific APN dedicated to the network slice. Another possible alternative is a common APN for all available slices with the addition of a slice specific identifier. Still other possibilities exist to identify a slice. In this description, the term "slice identifier" will be used to refer to any of the above or other possible alternatives.

In some embodiments, containers may use a device OS and would not require a container OS. Some considerations for using a container OS include the following. First, a container OS may possibly improve isolation of the container, as the device OS is a potential vulnerability. The container OS could be a full operating system or minimized operating system providing a protection layer. Second, the container OS may allow different operating systems or configurations per container. An example of such a container OS is one that uses memory encrypted application code. Only code parts needed at run time are decrypted and used. This would protect against external memory read out by e.g. an analyzer attached to memory chips. Third, the container OS may suppress certain device functions, as the container OS may lack driver connections for USB, Surface-Mount-Device (SMD) card or any other data input/output.

Figure 3:
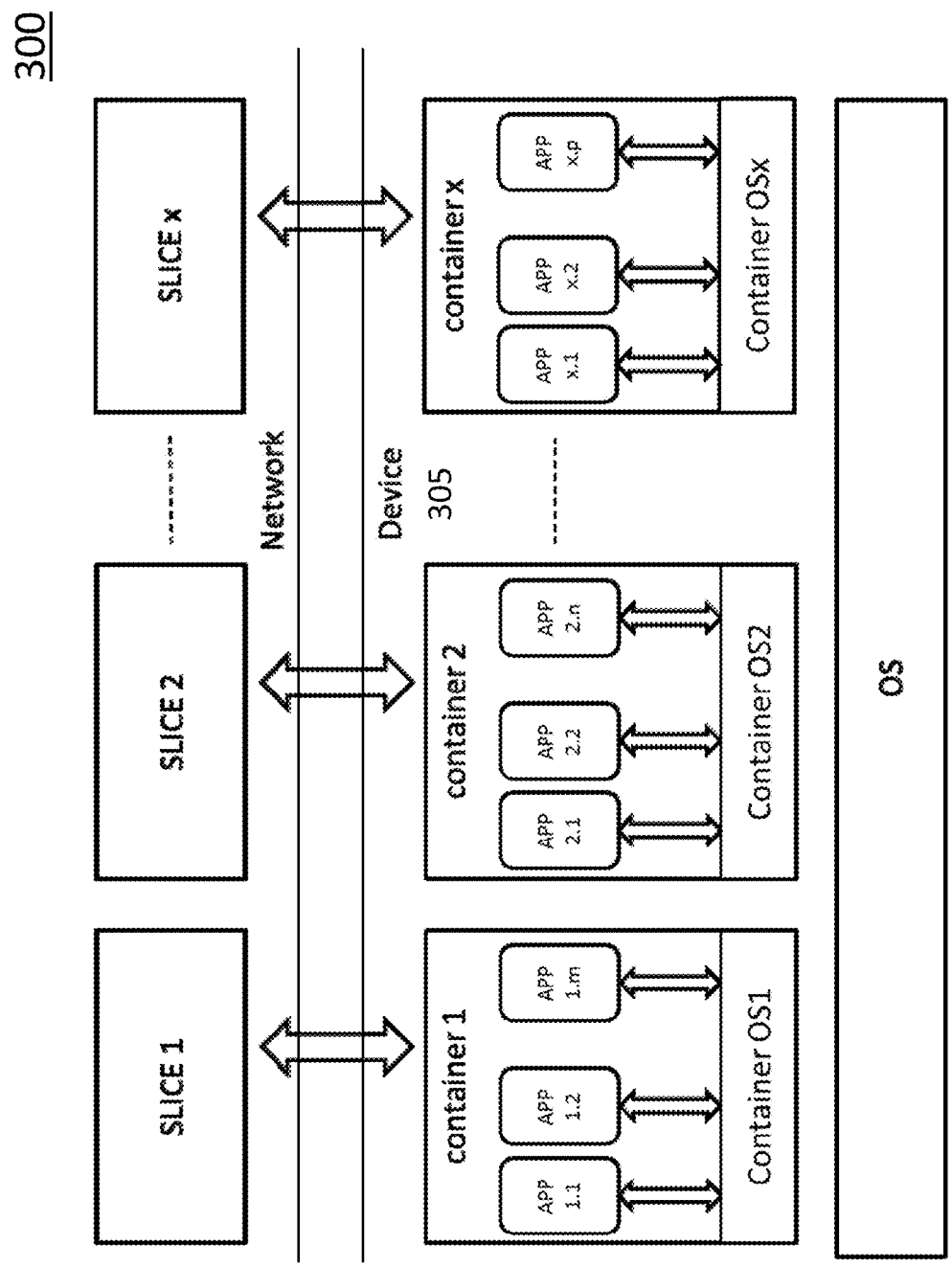
FIG. 3 illustrates a system comprising a device with multiple containers and a network with multiple network slices, according to another embodiment of the disclosed subject matter.
Figure 4:
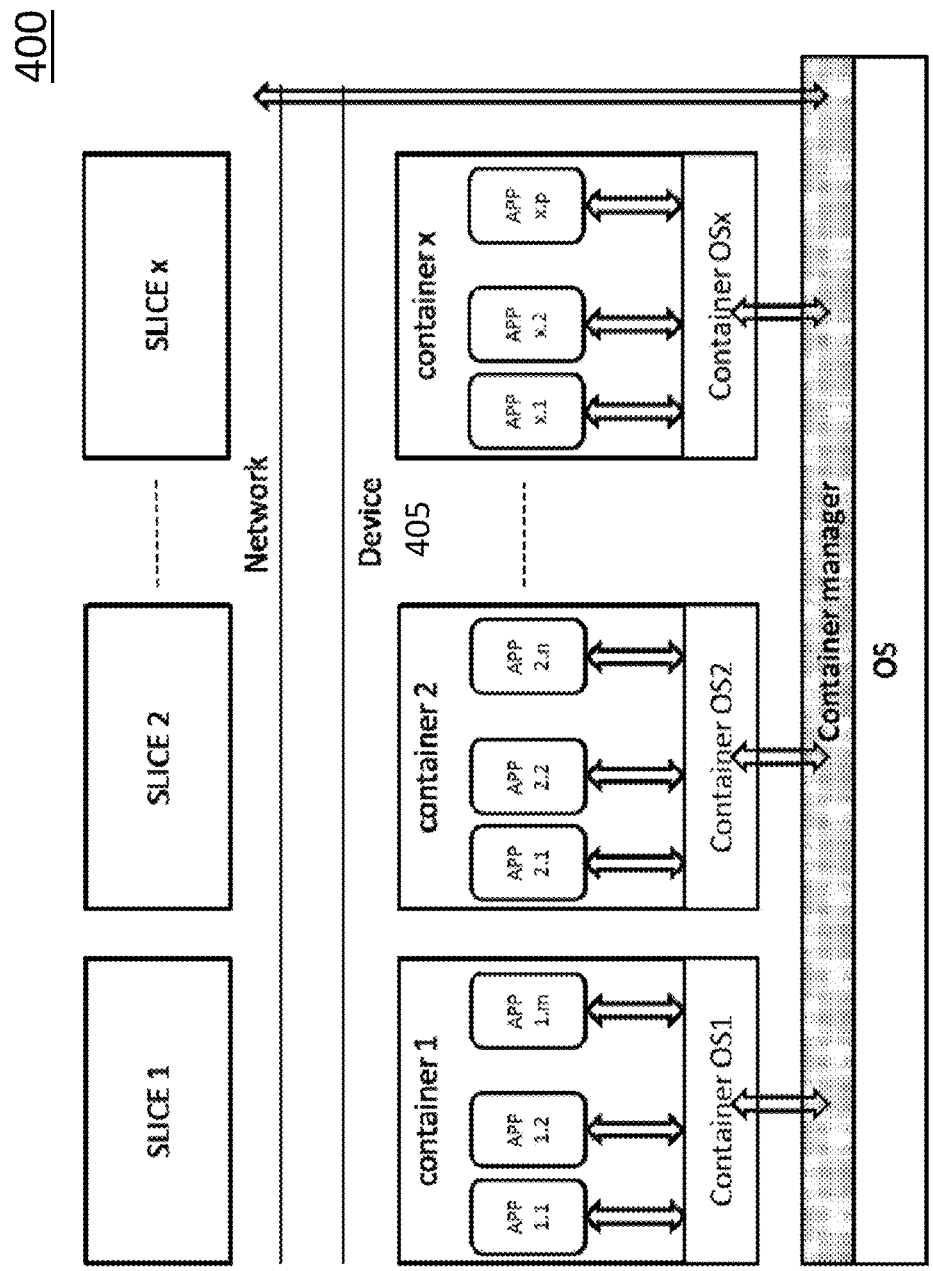
FIG. 4 illustrates a system comprising a device with multiple containers and a network with multiple network slices, according to yet another embodiment of the disclosed subject matter.
Figure 5:
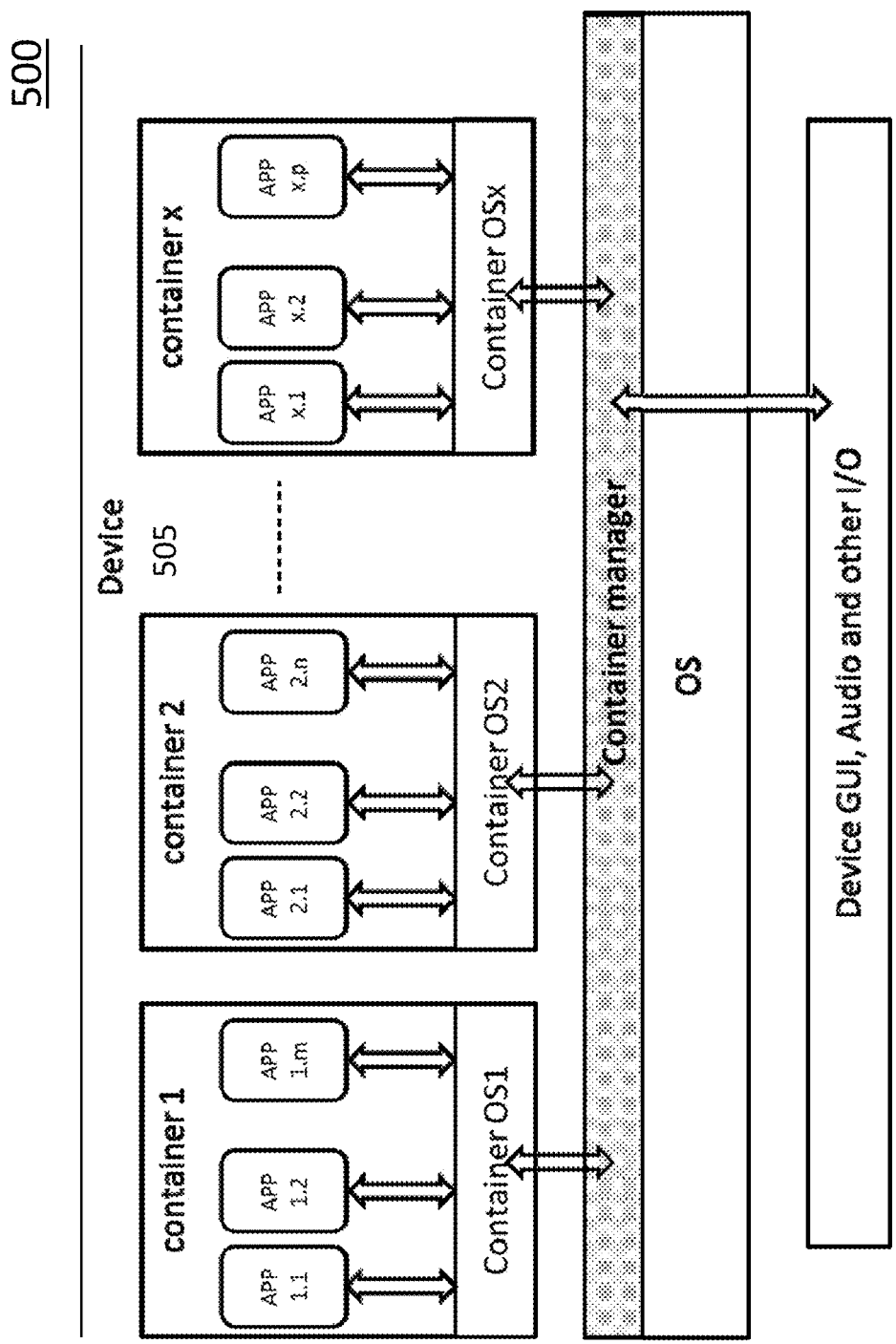
FIG. 5 illustrates a system comprising a device with multiple containers and a network with multiple network slices, according to still another embodiment of the disclosed subject matter.

FIGS. 3-5 illustrate variations of system 200. In particular, FIG. 3 illustrates a system 300 comprising a device 305 that is similar to device 205 of FIG. 2, except that each of containers 1-x further comprises a container OS and corresponding applications that run on the container OS. FIG. 4 illustrates a system 400 comprising a device 405 that is similar to device 305, except that the device OS further comprises a container manager. FIG. 5 illustrates a system 500 comprising a device 505 that is similar to device 405, except that the container manager and device OS are further connected to an input/output (IO) interface such as a GUI, audio interface, etc.

In general, a network may impose constraints on a device before it grants access to one of its slices. Such slice dependent constraints may have various forms of implementation. One example is a slice manifest that is provided to the device when it requests first time access or repeated access and the slice manifest has changed since the last request. The slice manifest may also be sent with every request, prompting the device to check if anything has changed. The network may also send the slice manifest unsolicited (without a specific request from the device) when it detects a first connection to the network of the device. This detection may be triggered by a user or device identity used for the first contact or the device provides an identification of supporting containers.

The network may provide one or more slice manifests based on identities or may advertise possible network slices e.g. on the device providing an identification of supporting containers. This will also avoid receipt of advertising or a slice manifest at devices that do not support containers.

Independent of the form and time in which the constraints are provided to the device, the slice manifest may include any of the following non-limiting items, in any appropriate combination: (a) access constraints e.g. in the form of a black-list or white list, (b) location constraints, (c) resource use constraints, (d) container population constraints, (e) container use constraints, and (f) container modification constraints.

Access

As indicated above, the device may have more than one type of access it can use to connect with a network slice. The slice manifest may contain a white list indicating which access types are allowed, or a black list indicating which access types are not allowed. Possible differentiations could be e.g. wireline vs. wireless access (radio eavesdropping), public WIFI and hot spot denied (local hacking), 2G/3G GPRS denied (transfer speed too low), Bluetooth denied, tethering denied. The slice manifest may further contain specific details per allowed access type (access list) and may comprise: slice identity, APN to use, IP address, port number, security credentials initiating secure tunneling. Note that any security or other information related to applications is included in the applications list, see below.

Location

For mobile devices or stationary devices that are removed from their stationary location, slice dependent constraints me be provided. Location restrictions might be in the form of allowed or not allowed APNs. Others might be country code of the access point e.g. 3GPP. Also endpoint identification like that for fixed connections can be used. The device's own independent location determination like GPS might be used for restricted area or allowed areas. It might be clear that various other location dependent restrictions are possible.

Resources

A device may have a large variety of resources, and the slice specific constraints may allow or prohibit privileged use or restricted use. In one example, local data export is prohibited by not allowing e.g. SD cards or other removable memory, USB ports, NFC, etc. In another example, local data import is disallowed. So one may print a page but may not upload potential harmful content. An example implementation may allow only output to resources as mentioned before. A further example is privileged use, which may prevent e.g. audio eavesdropping. When an application in the container in question uses a microphone of an end-user device no other container or application outside the container in question is allowed to use audio from the microphone at the same time. In addition, where an application in the container in question uses the speakers of an end-user device no other container or application outside the container in question is allowed to use audio from the microphone at the same time.

Container Population

A container is typically effective only when populated with one or more applications. A network slice may regulate which applications may be added into the container. One possible mechanism for this regulation is a blacklist that specifies applications that may not be installed in the container or types of communication that are not allowed (e.g. no FTP). Another possible mechanism is a white list specifying applications that might be installed or types of communication that are allowed (e.g. unrestricted, only secure hypertext transfer protocol [SHTTP]). A slice manifest may also specify the source location for obtaining an application that can run in the container. Another example is a locked container, in which the user of the device cannot add or remove applications. The applications are provided in the slice manifest as a mandatory application list. This includes the source location of the applications. For mandatory applications the slice manifest may specify automatic activation of the application. This may be beneficial for IOT like devices, for example. Automatic activation maybe indicated.

Container Use

In principle, applications in different containers can run in parallel. This may cause problems when two containers allow their respective applications to use the same resource. An example is a microphone in an end-user device. The user may need to provide focus to either container to use the microphone. Only the container in focus uses resources while others do not. An example of implementing container focus includes a visual representation of available containers on the device and the user being prompted to select one to give focus to.

Locked focus is an extension of the above. If a container has been given focus and for security reasons, the local operating system or an application must complete a task, the user may be prevented from changing focus temporarily until the task has been completed. An example is login procedures for e.g. a bank account, where login and encryption setting is a non-divisible task. Once encryption is established the user can change focus.

Privileged use is a stringent type of focus. Parallel running of applications in multiple containers can mean that they share a single processing element which provides risks related to register readout, and in general bypass memory management for illegal access of code/data segments. Privileged container use means that no other container or application is active when the container, and any application in it, is active. This may be accomplished by restarting the device with prior disablement of any other container and any application outside the container in question.

Freezing of a container is a temporary deactivation of the container. Any communication between applications of the frozen container to/from the network slices or access to device resources is prohibited. The freeze option can be used e.g. when connection with the network slice is lost or when actions need to be suspended until a security scan of the frozen container is completed.

Container Modification

The set of constraints for a network slice may be valid for multiple devices. In such a scenario an update of the slice manifest may be viewed as a new slice manifest for each of the multiple devices. One implementation can therefore be that an updated slice manifest causes the device to create a new container according to the updated slice manifest and discard the former container (forced renewal). This means that the slice manifest may mention previous versions of the slice manifest (and so containers) that are replaced.

Forced renewal has some potential drawbacks and potential benefits. One potential benefit is provided by an application history. In some circumstances it may be beneficial for the slice that application history data is to be discarded. In other circumstances this may be a drawback. Therefore, the slice manifest may additionally indicate if and for which applications historical data may be maintained.

In addition to the slice manifest, applications may also be subject to regular updates. Depending on a slice strategy for updates it might either freeze updates per container release or allow application updates outside of container updates.

In an example embodiment, the application list is provided for a locked container. The list may contain, per application, forced renewal, the required version, if updating is allowed and if historical data may be maintained, and the location to retrieve the application. It may further specify any security related information or other credentials for the application e.g. a certificate. It can also specify automatic activation when e.g. activation of the application is not triggered by a device detected event. When the slice does not provide forced renewal for the whole container then the device can create a new container but copy specific application code and or data based on the application list.

The container manager is a layer between the containers and device functions such as graphical user interface (GUI), audio, camera, universal serial bus (USB), secure digital (SD) card, humidity sensor, global positioning system (GPS), thermo-sensor, proximity sensor, vibration sensor etc. as well as the device's own operating system and the connection to the network. Containers may be totally or substantially shielded from their outside world, and any request, data, etc. may run through the container manager. The container manager may use a set of rules based on constraints in e.g. a "container manifest", to control the container environment.

Figure 7:
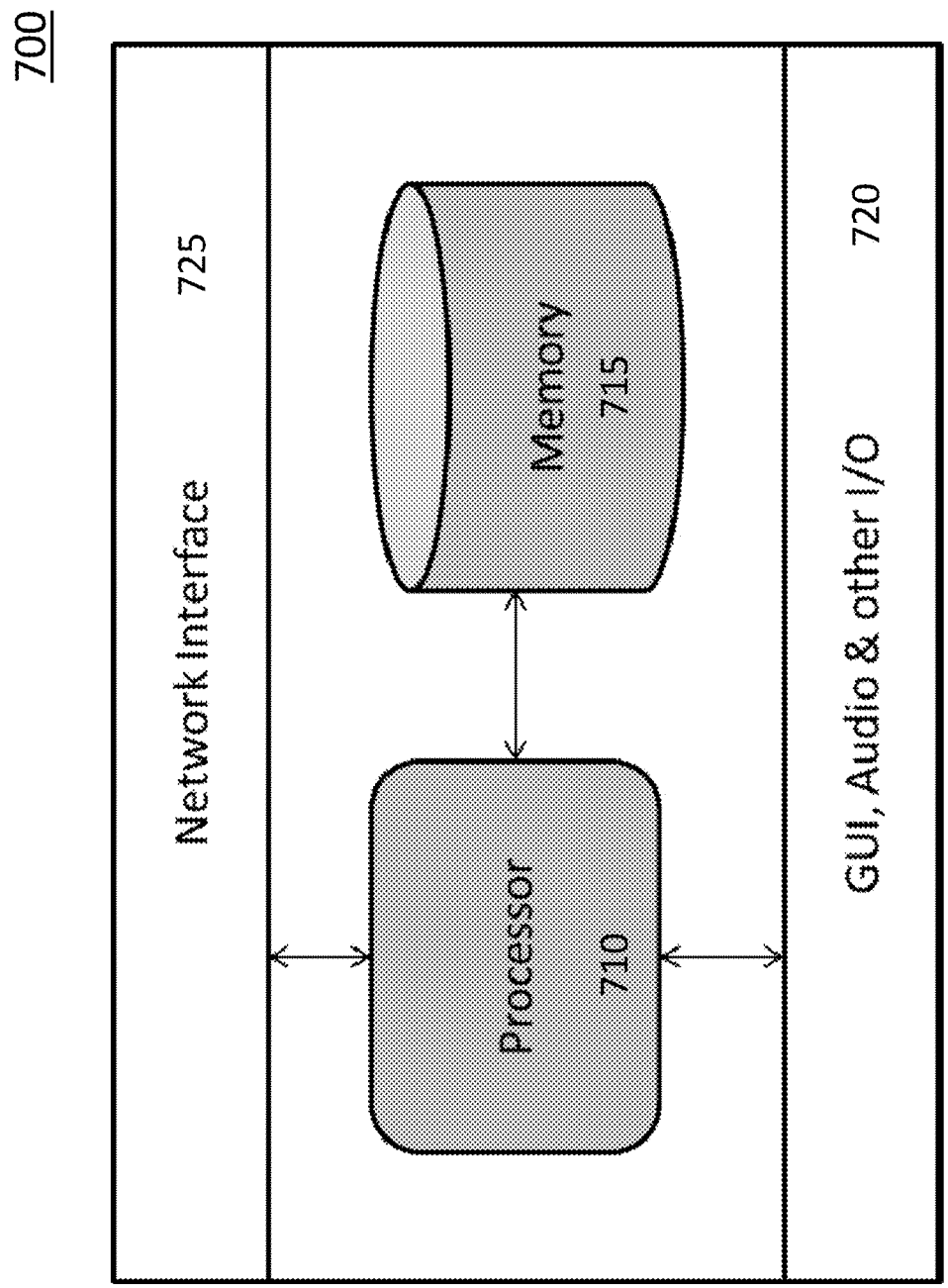
FIG. 7 illustrates a device according to an embodiment of the disclosed subject matter.
Figure 8:
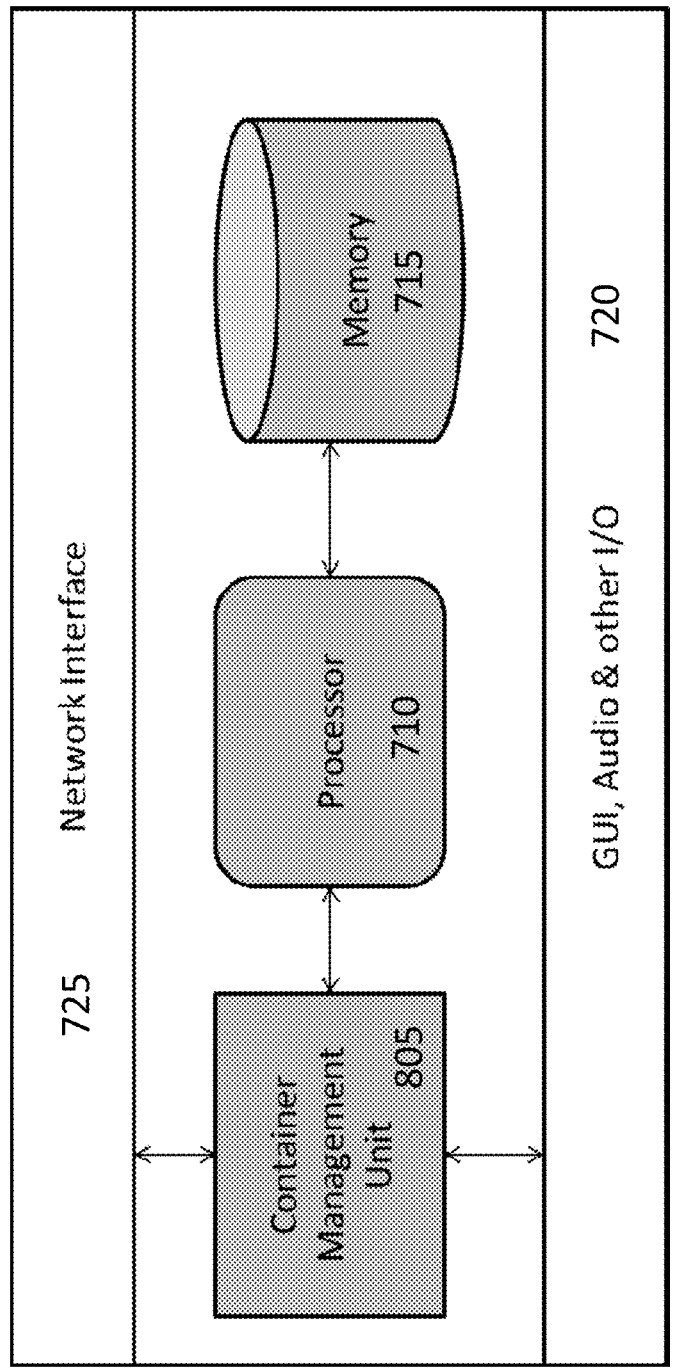
FIG. 8 illustrates the device with a container management unit, according to an embodiment of the disclosed subject matter.

A container management function may be implemented as coded instructions executed by a device processor independent from the operating system of the device, e.g. as in FIG. 7, but can also be a separate unit, i.e. a container management unit, integrated in the device, e.g. as in FIG. 8. An example embodiment of the unit could be a unit connected to a device internal bus. In the following description, the term "container manager" may mean either a container manager function or a container management unit.

The container manager may have its own identity for the purpose of its own communication.

Upon startup e.g. a restart of the device after installing the container manager or initial startup if the container manager is an integral part of the device as delivered, the device prepares the container environment. This may be done according to an included script, such as when the container manager is an integral part of the device, or by means of discovery and subsequent script.

In the case of discovery, the device type is discovered and required settings are obtained internally or externally via network access. Alternatively, the container manager discovers the device capabilities directly. The set of device capabilities is the base for rules regarding these capabilities when applying constraints for containers.

After setting up the container environment, the container manager can start creating containers. Various options of the container creation include which containers (or network slices) are created, and when and who initiates the creation. A few of these options will be discussed here as examples, including (a) IOT Device with Device Internal Configuration Script, (b) End-User Device with Internal Configuration Script, (c) End-User Device with no Internal Configuration Script, and (d) IOT Device Without Configuration Script.

IOT Device with Device Internal Configuration Script

During manufacture, the constraints and other details for a specific network slice are preprogrammed in the device by means of a configuration script which can be seen as a device stored container manifest. The container manager creates and populates the container with applications and prepares the rule set based on device capabilities and constraints in the container manifest. When ready, the container manager sets-up the connection to the network slice. In case of any outdated information in the local container manifest such may be repaired by an updated container manifest provided by the network, similarly applying to updating of applications.

End-User Device with Internal Configuration Script

During manufacture, the constraints and other details for a private network slice are preprogrammed in the device by means of a configuration script which can be seen as a device stored manifest. The container manager creates the container and prepares the rule set based on device capabilities and constraints in the manifest. When ready, the container manager sets-up the connection to the network slice. This may be a default container or a specific container, such as one tailored for IOT devices. The user may then add applications to the container as desired. The device may also add new containers based on advertising of available network slices by the network (or access point), optionally after confirmation by the user. The advertised set may be limited by the network to slices for public use and may refrain from advertising e.g. corporate slices.

End-User Device with no Internal Configuration Script

The container manager creates a default container with no constraints. No rule set is created for the container. When ready, the container manager sets-up the connection to the default network slice. The user may then add applications to the container as desired. The user may also add new containers as done in "End-User Device with Internal Configuration Script" according to the above description.

IOT Device Without Configuration Script

The IOT device may be generic for connection to multiple corporate slices, like a burglar/fire detection unit which can be connected to a variety of corporate network slices belonging to a variety of security companies. When the container environment is prepared the container manager prompts an operator/programmer of the device to enter the credentials of the network slice to use. When connecting to the network slice the container manager receives an initial manifest and configures the container and applicable rules based on that. An alternative is that the network detects an initial attachment and first leads the user/operator to a web page application or the like for authentication and allowance to use the network slice before sending the actual manifest.

The addition of a new container can be user triggered or network triggered. The user may select a network slice from a set advertised by the network or may enter manually the network slice identification. The network provides a correct network slice manifest upon request by the device, when the network has determined that the device is allowed to have access to this network slice.

As an alternative to the user based request, the network could send the network slice manifest without a request of the device. This is potentially beneficial for IOT like devices, or other devices not denoted as end-user devices.

The container manager receives the container manifest and acts accordingly. In particular, the container manager may perform the following operations as a consequence of receiving the container manifest. It creates the container, and then configures a rule set based on device characteristics and constraints in the container manifest. Thereafter, it populates the container with applications that are stated as mandatory in the manifest. This may also include configuration of the application. The container manager may then validate and activate the populated container. The activation may include activating mandatory applications. Non mandatory applications might also be activated automatically but in general this may be a user or device operator task. The activation of the container may also include configuration of device resources. Activation (or use) of the resources is triggered by an application requesting such use from the container manager. The container manager may also require restart of the device to enact changes according to the procedure.

Updating of a container is triggered by the receiving of a slice manifest (or container manifest). The network may send the slice manifest each time the device attaches, when update is required, or independently whenever the device is connected and update is required. The update may be send to and valid for all device or only towards a specific device.

One reason for updating a container may be changes to constraints, or the application list. The update may comprise forced renewal of the whole container and all applications, which includes user added applications being discarded and only mandatory applications being installed. The user must then manually add his regular applications. An example of the latter is a user requested "reset" when a combination of container and applications does not properly work anymore, where the network sends a "reset" slice manifest.

As indicated above, the container manager receives the slice manifest and starts executing it. In case of forced renewal of the whole container, the container manager may add a new container. When validation is completed, the container manager removes the old container, and then activates the new container. The slice manifest may also contain a specific script to be followed by the container manager. Such a script may apply to e.g. corporate slices and mission critical applications. Correct functioning of the new application in the new container is usually verified before the old application in the old container is deactivated.

If forced renewal of the whole container is not required, the container manager may inspect the slice manifest and compare it to the one used for establishing the current container for the network slice. This implies that the container manager has saved the latest slice manifest it has used for the container.

When there are changes in the constraints, the container manager may behave similar to forced renewal with creation of a new container, and remove the old container. A difference with respect to forced renewal, however, is that the container manager may maintain certain application data (e.g. coding, data, history, etc.) as far as an application list in the slice manifest allows and does not require further modifications.

When the changes would only address single applications the container manager may preserve the current container and only do application updates for relevant applications. This may include adding a new application (typically mandatory) or removing an application (black-listed). In certain circumstances, the container manager may force restart of the device to effectuate changes.

Removal of a container will typically be a user/operator request. In certain circumstances, removal may also be carried out or requested from the network side either indirectly (as result of an update slice manifest) or directly e.g. upon termination or end of a subscription e.g. for content delivering.

The container manager can remove the container, the applications in the container and any related data. The container manager can also update the configuration of device resources where applicable. In some circumstances, the container manager forces a restart of the device to make changes active.

A user/operator of the device may add or remove applications as far as allowed by the slice manifest (e.g. based on an included application list). Adding or removing applications may also be network triggered when the container manager receives a new (updated) slice manifest. In both cases the container manager adds or removes the application. In case of a user/operator request, the container manager checks the slice manifest for the container to determine if the application is not black listed (for add) or mandatory (for remove). The container manager may adjust device resource configurations and even force restart of the device to effectuate any changes.

An additional action of the container manager may be that when adding an application is not allowed in one container specified by the user, the container manager checks if there are other containers where the application may be added and proposes these other containers to the user/operator.

A further action of the container manager may be validation of an application to be proposed to be added. If an application is contained in the application list of the slice manifest, it will typically be verified or have a certificate allowing easy verification. User/operator entered applications are more likely not to be correct. The container manager tries to get a certificate. If no certified identification is possible or verification fails, the container manager does not add the application.

Applications in containers may be of different categories. Applications may be activated by a user/operator and be active until deactivated by the user/operator. Applications may be running continuously from initial activation onward. applications may be activated and deactivated by the container manager as triggered by device events. The user/operator action can also be seen as a device related event comparable to items like heat sensor value, or proximity warning. A rule set used by the container manager for a container in which the application is contained may provide values, limitations for trigger level as well as validity expressions.

As indicated above, the container manager shields the containers, which means that all communication of applications run through the container manager. A device may also have multiple access possibilities using different technologies as described above.

The container manager typically involves at least two functions, including the controlling of access possibilities, and the routing of traffic between containers (applications) and the network. Both functions will be discussed below in further detail.

All containers can in principle use the same radio or wireline interface(s), but a particular container may be restricted to only allow communication on a certain interface. On the other hand, a particular network slice might limit access possibilities. This facilitates meeting certain SLAs depending on the network slice. Also, other reasons, such as security level, transport rates, or other QoS aspects may necessitate limiting communications to certain technologies.

A container typically uses/accesses a particular network slice using an interface that is both available at the device and supported by the particular network slice.

Figure 6:
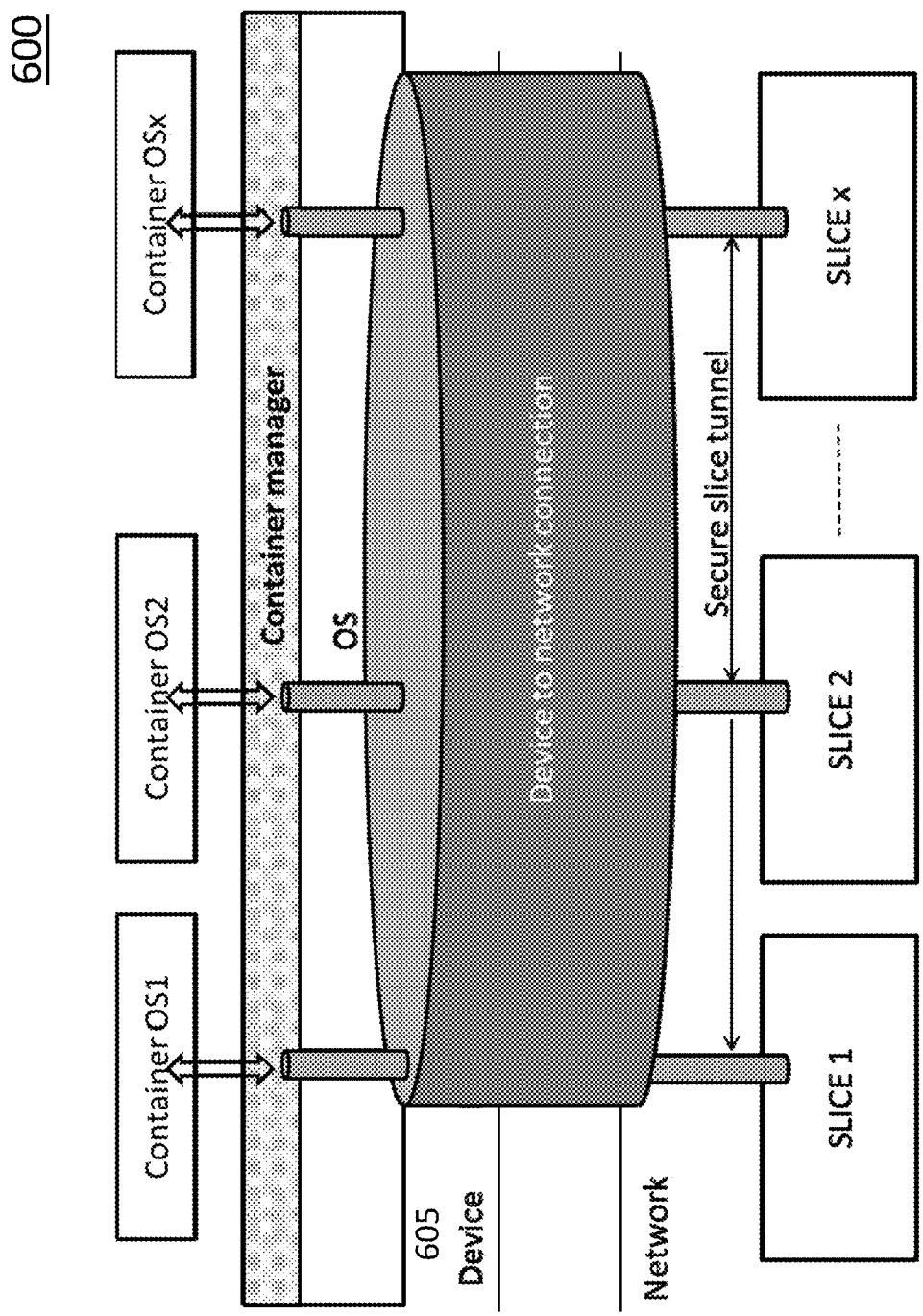
FIG. 6 illustrates a system configured to perform secure slice communication according to an embodiment of the disclosed subject matter.

In some embodiments, the container manager restricts access as to which interface a certain container (or the applications in it) may use. In principle this will be a one to one relation from the point of view of the container. Some containers may, however, use the same interface for connection to different slices. Such a situation is shown in FIG. 6 where a single radio channel (labeled "Device to network connection") connects the network and the device but inside the channel separate channels (labeled "secured slice tunnel") exist per container. Although the term "channel" is used here, the term "bearer" or "tunnel" could be used interchangeably with "channel" in this context.

In case of a moving device or as a fallback, more than one combination of access interface and network slice identity may exist. One example is @Home for movie streaming where other locations than at your home are not allowed due to rights for the movie. When premises are covered by more than one WiFi station, however, more than one combination may exist as well. WiFi and fallback on 4G will provide more than one combination.

The container manager acts according to the container rules that indicate which interface is allowed for the container and to which network slice it should be connected when an application in the container requires communication to the network.

If there are changes in the network (for connecting to a network slice), the network information about this reaches the container manager and the container manager changes the access accordingly. This can typically happen in a situation where e.g. the device is moving and a handover occurs, or when a fallback using a different interface occurs.

The container manager may increase shielding by establishing a secure tunnel between network slice and container. This does not eliminate the possibility that an application may also establish a secure tunnel inside this tunnel for communication with a specific service in or via the network slice. Authentication and cyphering required for the container tunnel is performed by the container manager.

As an alternative, when a container has its own container OS, encryption and decryption may be performed by the container OS. This may increase a security level due to isolation from applications in other containers. The network slice manifest may specify where to put a higher trust level in relation to the location where encryption and decryption is performed.

Typically, incoming traffic will end up in/be controlled by the container manager. Implementation-wise, the container manager may control the internal routing engine, but the routing engine as such may not necessarily be part of the container manager. Signaling may end up in the relevant interface depending on the layer (L1 mostly will). It is then up to the container manager to determine if a signal or message is for itself or for a container. The combination of interface and slice identity of the messages indicates for which container the message is intended. This information is used for routing the message. When the encryption level is at the container manager, this information is also required for encrypting the message before the container manager can take the second pass. When the encryption level is at the container, the routing takes place with encrypted messages to the container. In this case there is no second pass. In a second pass the container manager determines from the message if it is intended for an application in the container or for control purposes to be handled by the container manager. In principal the container manager handles both messages addressed to the container manager's own identity and more generally any message not addressing a specific application present in the container.

The incoming message for a certain application in a certain container might be an event trigger for activating the application.

Outgoing traffic is generated by applications in containers or in certain circumstances by the container manager itself. Applications do not need to be aware of the network slice used as this is directly obtainable from the relation between application and container. Only where the container is allowed to use more than one interface at the same time the application must specify which interface it requires. The container manager couples the slice identity based on the container (and the required interface if needed) to the message before/during routing. When continuous tunnels exist the container manager directly sends the message or otherwise a temporary tunnel may be set up for this purpose. When the encryption level is at the container manager, it encrypts messages before routing and coupling to slice identity is done before encryption.

Incoming and outgoing messages of the device OS are initially treated as being container manager communication. The operating system can bypass the container manager by directly addressing interfaces but when creating the container environment control of interface drivers should be altered to control by the container manager.

Where required, the container manager passes received message for itself further to the device OS. Outgoing messages of the device OS are checked by the container manager and when required sent out.

When a container has its own OS, messages for the container are forwarded by the container manager to the container OS, which takes care of delivery to the application in the container, unless the message was addressed to the container OS itself. Outgoing follows the opposite direction.

The container manager may be solely responsible for managing device resources. Certain exceptions include memory and disk storage, and internal bus direct memory access (DMA), interrupt system etc., which are typically incorporated by the operating system. A distinct case is a merged device container manager that also performs operating system tasks. Hence, the device will no longer have an operating system but only a container manager that acts accordingly. With standardization of operating systems this may be quite applicable when low level driving can be captured by means of a BIOS or the like.

FIG. 5 illustrates a situation where the OS controls basic items such as memory management, bus DMA and interrupt system, and the container manager controls other resources such as an access interface, speaker, camera, GPS receiver, any sensors for vibration, heat, proximity etc. USB, and SMD cards.

When the container manager sets-up the container environment it may preconfigure the resources it can control in a way that they are controlled by the container manager solely. This may include setting in low level drivers. This configuration may then be valid for all containers.

With the installation of a specific container, the container manager can make further configurations to resources, and when installing specific applications even a further configuration might be done. In certain embodiments, however, the container manager resolves conflicting configurations across the different levels. In such embodiments, where conflicts arise an initial setting is done but a reconfiguration is needed prior to the use by a specific application. The container manager keeps configuration setting sets per application and container in case of conflicts. Alternatively, the container manager keeps a configuration setting set for all applications installed for the resources they are allowed to use.

When an application wants to make use of a resource the container manager may need to reconfigure the resource in question. Before that, the container manager checks its rule set if the resource is allowed under current circumstances. Access by the application might be denied if the resource is not allowed.

In certain embodiments, focus may be given to a particular container or containers. Especially for end-user devices with multiple containers, the end-user might give focus to one or the other container. The container in focus would then have priority in case of access conflicts and the container manager may take this into account when evaluating its rule set.

As indicated above, the container manager may be its own hardware unit inside the device, or it may be a set of coded instructions in the memory of the device that when executed by the processor of the device causes the device to perform the functions of the container manager. In the latter case also registers etc. used by the container manager are located in the memory of the device.

In addition, the container manager might be a layer on top of the device OS or it may comprise OS functions or even completely replace the operating system of the device. This is independent from the issue of whether the container manager is implemented as software or as a hardware unit.

Figure 9:
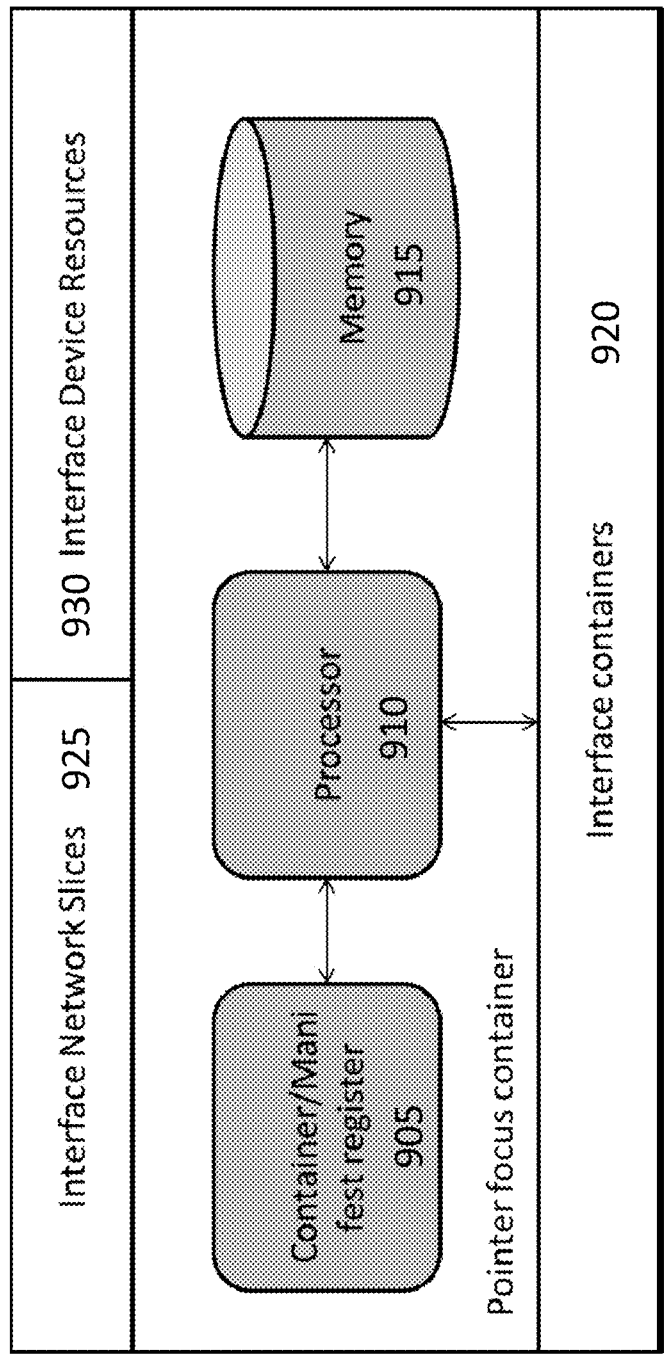
FIG. 9 illustrates a device with a container/manifest register according to an embodiment of the disclosed subject matter.

FIGS. 7-9 illustrate different device architectures according to various alternative embodiments of the disclosed subject matter. In the embodiment of FIG. 7, a device 700 comprises a processor 710, a memory 715 operatively coupled to processor 710, an input/output (IO) interface 720, and a network interface 725. In the embodiment of FIG. 8, a device 800 is similar to device 700, except that it further comprises a container management unit 805 operatively coupled to processor 710 and memory 715, IO interface 720, and network interface 725. In the embodiment of FIG. 9, a device 900 comprises features that collectively function as a container manager as described herein. In particular, device 900 comprises a container/manifest register 905 (or "container slice register") that includes a pointer to a focus container. The pointer, also referred to as a "container focus pointer" indicates an entry in register 905 based on a focus provided by an operator/user, and so device 900 gives priority to the indicated entry when evaluating a rule set generated by the container manager. Container/manifest register 905 is operatively coupled to a processor 910 and a memory 915. Processor 910 is operatively coupled to a container interface 920, a network slice interface 925, and a device resource interface 930.

If the container manager is implemented as one or more software functions, the processor and memory may in fact be the processor and memory of the device. The same principle may apply for the container manifest register with the focus pointer. In case of a hardware-implemented container manager, the processor and memory may be parts of the container management unit.

The container manager may have a container/manifest register where the manifest is stored for each container. The register may also include a rule set for a container, configuration settings and other specific details per container. The container manager's own dedicated processor, or the device processor, executes a set of coded instructions in the container manager's own memory, or the device memory. The executed coded instructions perform the functions of the container manager.

Example functions of the container manager include the following: (a) creating a container environment in the device, (b) adding, modifying or deleting containers steered by container manifests, (c) adding, modifying or deleting applications steered by container manifests, (d) configuration of device resources, (e) connection of containers to corresponding network slices, (f) handling communication between applications within the container and the network slice, and (g) handling communication between applications and device resources.

Figure 10:
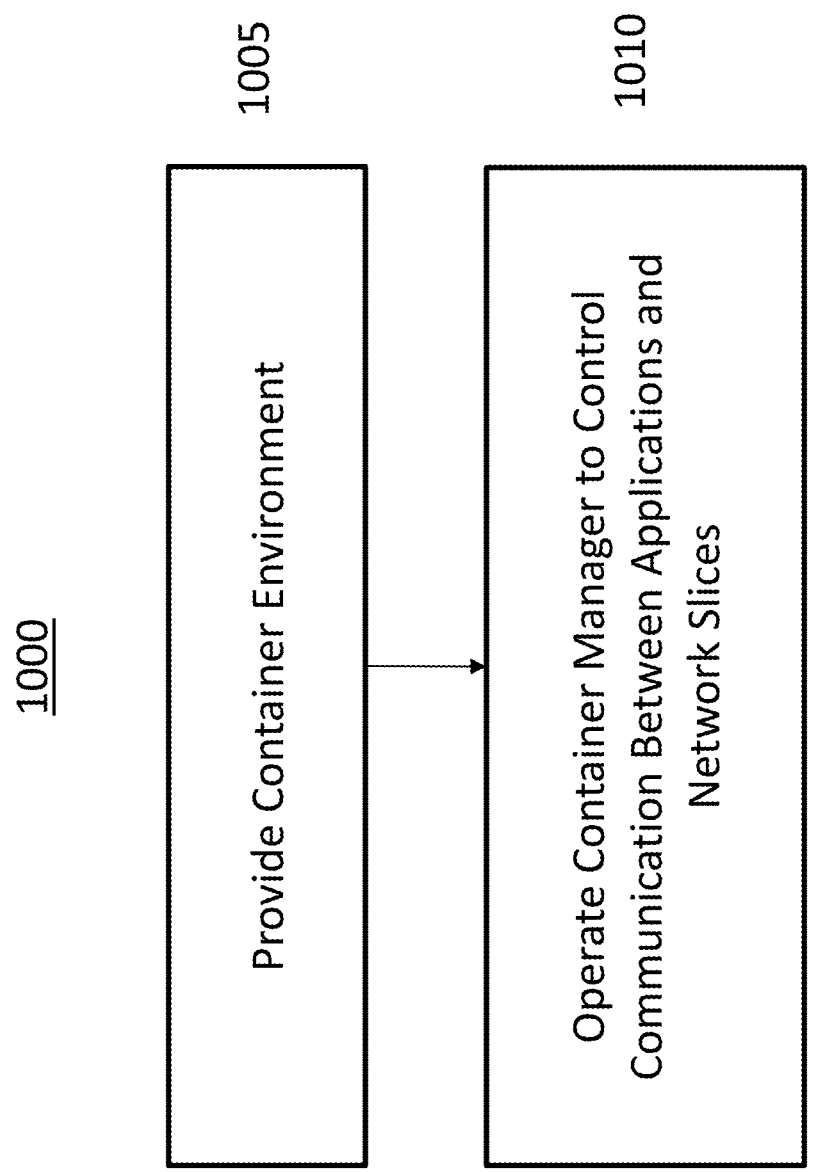
FIG. 10 illustrates a method of operating a device comprising a container environment and a container manager, according to an embodiment of the disclosed subject matter.

FIG. 10 illustrates a method 1000 of operating a device comprising a container environment and a container manager, according to an embodiment of the disclosed subject matter. Such a method could be performed by e.g. an apparatus as described in relation to one or more of FIGS. 1-9. In such embodiments, the method may be implemented by at least an appropriate combination of processing circuitry and memory collectively configured to perform or enable the stated functionality. Moreover, in some embodiments, the method may be implemented by modules, where a module comprises any suitable combination of hardware and/or software configured to perform or enable the stated functionality.

Referring to FIG. 10, the method comprises providing a container environment comprising a plurality of containers each having one or more applications and each being connectable to a network slice (S1005), and operating a container manager to control communication between the applications and the network slices, wherein the container manager prohibits communication between a first application in a first container and a second application in a second container (S1010). The providing of the container environment may include any mechanism or functionality that results in operation of the container environment. For instance, the providing may be achieved by configuring hardware and/or software for the container environment, and/or storing and/or executing instructions to operate the container environment. Similarly, the operating of the container manager may comprise any mechanism or functionality that results in controlling the communication between the applications and the network slices as described.

In certain related embodiments, the communication device further comprises device resources, and the method further comprises operating the container manager to control access of applications to the device resources.

In certain related embodiments, applications in different containers share the device resources.

In certain related embodiments, each container is associated with exactly one network slice at a time. In some such embodiments, the association between the container and the network slice comprises using a dedicated access point name (APN) for the network slice. In other such embodiments, the association between the container and the network slice comprises using encrypted communication between the container and the network slice via a shared access point name (APN). In still other such embodiments, the association between the container and the network slice comprises using tunneling between the container and the network slice.

In certain related embodiments, each container uses its own electronic subscriber identity module (eSIM) to access credentials for authentication and/or authorization.

In certain related embodiments, at least two of the containers use the same electronic subscriber identity module (eSIM) to access credentials for authentication and/or authorization.

In certain related embodiments, at least two of the network slices are served by the same operator.

In certain related embodiments, at least one of the network slices corresponds to a virtual operator.

In certain related embodiments, the container manager defines rules per container and controls communication between containers such that communication is allowed between applications in the same container and is prohibited between applications in different containers.

In certain related embodiments, the wireless device further comprises device resources, wherein each of the containers has a container configuration policy that governs access by the container to the device resources.

In certain related embodiments, the containers operate in parallel.

In certain related embodiments, the method further comprises receiving a manifest for a container via the network slice interface, generating at least one container as defined by the manifest, generating a rule set for the generated container according to constraints in the manifest, establishing a connection between the generated container and a corresponding network slice, and controlling communication between the generated container and the corresponding network slice according to the generated rule set. In some such embodiments, the method further comprises storing the manifest in the container slice register together with the generated rule set. In some such embodiments, the method further comprises maintaining a container focus pointer indicating an entry in the container slice register based on focus provided by an operator/user, and to give priority to the indicated entry when evaluating the rule set.

Figure 11:
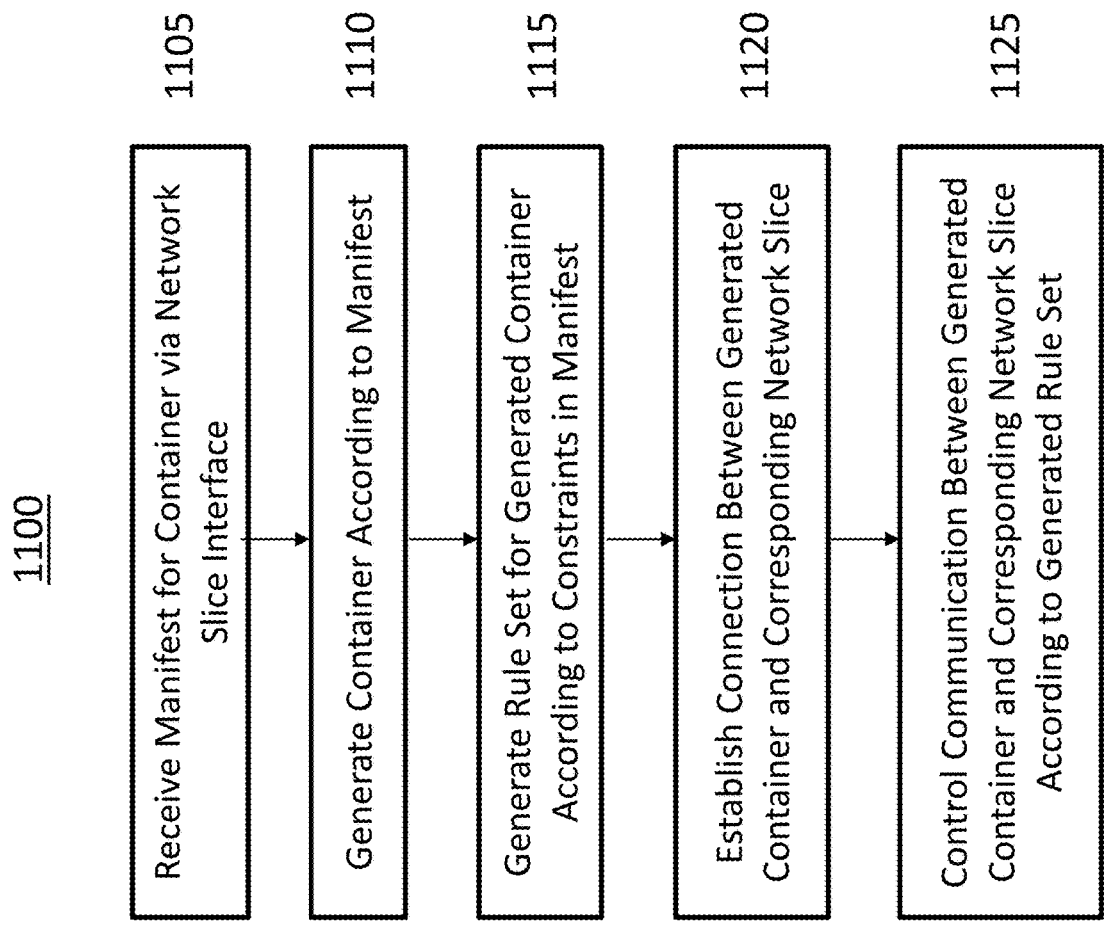
FIG. 11 illustrates a method of managing containers in a device comprising a container environment and a container manager, according to an embodiment of the disclosed subject matter.

FIG. 11 illustrates a method of managing containers in a device comprising a container environment and a container manager, the container environment comprising a plurality of containers each comprising one or more applications, each container being connectable to a network slice. The method could be performed by a device such as those illustrated in any of FIGS. 2-5, for instance.

Referring to FIG. 11, the method comprises receiving a manifest for a container via the network slice interface (S1105), generating a container according to the manifest (S1110), generating a rule set for the generated container according to constraints in the manifest (S1115), establishing a connection between the generated container and a corresponding network slice (S1120), and controlling communication between the generated container and the corresponding network slice according to the generated rule set (S1125).

In certain related embodiments, the method further comprises storing the manifest in a container slice register. In certain other related embodiments, the method further comprises maintaining a container focus pointer indicating an entry in the container slice register based on focus provided by an operator/user, and to give priority to the indicated entry when evaluating the rule set.

The following abbreviations, among others, are used throughout this written description.

2G, 3G, 4G Second, Third, and Fourth Generations of 3GPP Defined Radio Access Technologies
3GPP Third Generation Partnership Project
APN Access Point Name
BIOS Basic Input/Output System
DMA Direct Memory Access
DSL Digital Subscriber Line
GPRS GSM Packet Radio System
GPS Global Positioning System
GUI Graphical User Interface
IMEI International Mobile Equipment Identity
IOT Internet Of Things
LAN Local Area Network
LTE Long Term Evolution
MAC Media Access Control
NFC Near field Communication
OS Operating System
PC Personal Computer
QoS Quality of Service
SIM Subscriber Identity Module also denoted USIM/UICC
SLA Service level agreement
SD memory card
UE User Equipment
USB Universal Serial Bus
WIFI Wireless Fidelity While the disclosed subject matter has been presented above with reference to various embodiments, it will be understood that various changes in form and details may be made to the described embodiments without departing from the overall scope of the disclosed subject matter.

The invention claimed is:

1. A device, comprising:
a container environment comprising a plurality of containers each having one or more applications and each being associated with a different network slice and uniquely identifying an association; and
a container manager configured to control communication between the applications and the network slices, wherein the container manager prohibits communication between a first application in a first container and a second application in a second container;
wherein an association between a container of the plurality of containers and one of the different network slices comprises one or more of:
using a dedicated access point name (APN) for the network slice; and
using encrypted communication between the container and the network slice via a shared access point name (APN).

2. The device of claim 1, further comprising device resources, wherein the container manager controls access of the applications to the device resources.

3. The device of claim 2, wherein the applications in different containers share the device resources.

4. The device of claim 1, wherein each container is associated with exactly one network slice at a time.

5. The device of claim 4, wherein the association between the container and the network slice comprises using the dedicated APN for the network slice.

6. The device of claim 4, wherein the association between the container and the network slice comprises using encrypted communication between the container and the network slice via the shared APN.

7. The device of claim 4, wherein the association between the container and the network slice comprises using tunneling between the container and the network slice.

8. The device of claim 1, wherein each container uses its own electronic subscriber identity module (eSIM) to access credentials for authentication and/or authorization.

9. The device of claim 1, wherein at least two of the containers use the same electronic subscriber identity module (eSIM) to access credentials for authentication and/or authorization.

10. The device of claim 1, wherein at least two of the network slices are served by the same operator.

11. The device of claim 1, wherein at least one of the network slices corresponds to a virtual operator.

12. The device of claim 1, wherein the container manager defines rules per container and controls communication between containers such that communication is allowed between applications in the same container and is prohibited between applications in different containers.

13. The device of claim 1, further comprising device resources, wherein each of the containers has a container configuration policy that governs access by the container to the device resources.

14. The device of claim 1, wherein the containers operate in parallel.

15. The device of claim 1, further comprising:
a device operating system; and
a plurality of container operating systems each associated with a corresponding container among the plurality of containers.

16. The device of claim 1, wherein the container manager comprises:
a register comprising information that identifies the association between the containers and the network slices;
interfaces towards the containers and the network slices; and
memory storing coded instructions that when executed by the container manager processor cause the container manager to:
receive a manifest for a container via the network slice interface;
generate at least one container as defined by the manifest;
generate a rule set for the generated container according to constraints in the manifest;
establish a connection between the generated container and a corresponding network slice; and
control communication between the generated container and the corresponding network slice according to the generated rule set.

17. The device of claim 16, wherein the instructions cause the container manager to store the manifest in the container slice register together with the generated rule set.

18. The device of claim 16, wherein the instructions cause the container manager to maintain a container focus pointer indicating an entry in the container slice register based on focus provided by an operator/user, and to give priority to the indicated entry when evaluating the rule set.

19. A method of operating a communication device, comprising:
providing a container environment comprising a plurality of containers each having one or more applications and each being associated with a different network slice and uniquely identifying the association; and
operating a container manager to control communication between the applications and the network slices, wherein the container manager prohibits communication between a first application in a first container and a second application in a second container;
wherein an association between a container of the plurality of containers and one of the different network slices comprises one or more of:
using a dedicated access point name (APN) for the network slice; and
using encrypted communication between the container and the network slice via a shared access point name (APN).

20. The method of claim 19, wherein the communication device further comprises device resources, and the method further comprises operating the container manager to control access of the applications to the device resources.

21. The method of claim 20, wherein the applications in different containers share the device resources.

22. The method of claim 19, wherein each container is associated with exactly one network slice at a time.

23. The method of claim 22, wherein the association between the container and the network slice comprises using the dedicated APN for the network slice.

24. The method of claim 22, wherein the association between the container and the network slice comprises using encrypted communication between the container and the network slice via the shared APN.

25. The method of claim 22, wherein the association between the container and the network slice comprises using tunneling between the container and the network slice.

26. The method of claim 19, wherein each container uses its own electronic subscriber identity module to access credentials for authentication and/or authorization.

27. The method of claim 19, wherein at least two of the containers use the same electronic subscriber identity module to access credentials for authentication and/or authorization.

28. The method of claim 19, wherein at least two of the network slices are served by the same operator.

29. The method of claim 19, wherein at least one of the network slices corresponds to a virtual operator.

30. The method of claim 19, wherein the container manager defines rules per container and controls communication between containers such that communication is allowed between applications in the same container and is prohibited between applications in different containers.

31. The method of claim 19, wherein the communication device further comprises device resources, wherein each of the containers has a container configuration policy that governs access by the container to the device resources.

32. The method of claim 19, wherein the containers operate in parallel.

33. The method of claim 19, further comprising:
receiving a manifest for a container via a network slice interface;
generating at least one container as defined by the manifest;
generating a rule set for the generated container according to constraints in the manifest;
establishing a connection between the generated container and a corresponding network slice; and
controlling communication between the generated container and the corresponding network slice according to the generated rule set.

34. The method of claim 33, further comprising storing the manifest in a container slice register together with the generated rule set.

35. The method of claim 33, further comprising maintaining a container focus pointer indicating an entry in a container slice register based on focus provided by an operator/user, and to give priority to the indicated entry when evaluating the rule set.

* * * * *

UNITED STATES PATENT AND TRADEMARK OFFICE
CERTIFICATE OF CORRECTION

PATENT NO. : 11,323,478 B2
APPLICATION NO. : 15/517474
DATED : May 3, 2022
INVENTOR(S) : Djordjevic et al.

Page 1 of 2

It is certified that error appears in the above-identified patent and that said Letters Patent is hereby corrected as shown below:

In the Specification

In Column 1, Line 7, delete "application" and insert -- application is a National Stage Entry of PCT/IB2017/051896, filed Apr. 5, 2017, which --, therefor.

In Column 1, Line 9, delete "disclosure of which is" and insert -- disclosures of which are --, therefor.

In Column 1, Line 10, delete "its" and insert -- their --, therefor.

In Column 3, Line 13, delete "set" and insert -- set. --, therefor.

In Column 6, Line 44, delete "(IOT)" and insert -- (IoT) --, therefor.

In Column 7, Line 65, delete "(c)" and insert -- (d) --, therefor.

In Column 7, Line 66, delete "(d)" and insert -- (e) --, therefor.

In Column 8, Line 1, delete "(e)" and insert -- (f) --, therefor.

In Column 8, Line 6, delete "equipment identity (IMEI)" and insert -- International mobile equipment identity (IMEI) --, therefor.

In Column 9, Line 30, delete "me be" and insert -- may be --, therefor.

In Column 10, Line 8, delete "IOT" and insert -- IoT --, therefor.

In Column 11, Line 12, delete "and or" and insert -- and/or --, therefor.

In Column 13, Line 8, delete "send" and insert -- sent --, therefor.

Signed and Sealed this
Thirtieth Day of August, 2022

Katherine Kelly Vidal
*Director of the United States Patent and Trademark Office*

In Column 14, Line 26, delete "applications" and insert -- Applications --, therefor.

In Column 19, Line 49, delete "GSM" and insert -- General --, therefor.

In Column 19, Line 64, delete "memory card" and insert -- Secure Digital memory card --, therefor.